April 29, 1930. J. L. PECH 1,756,301
REFLECTOR FOR RAYS EMITTED BY A LUMINOUS SOURCE
Filed Nov. 14, 1927
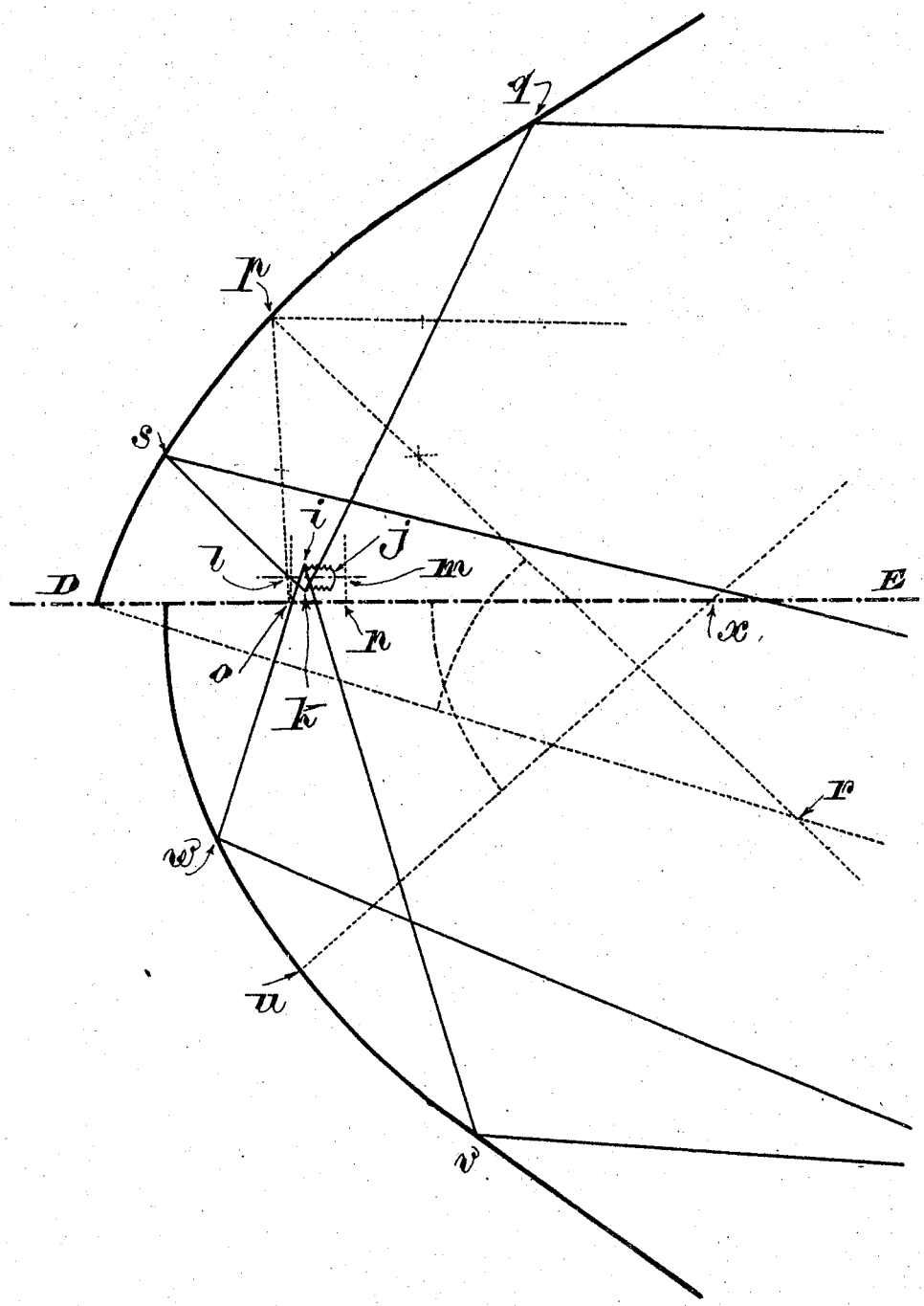
Inventor:
Jacques Louis Pech Patented Apr. 29, 1930

1,756,301

UNITED STATES PATENT OFFICE

JACQUES LOUIS PECH, OF MONTPELLIER, FRANCE

REFLECTOR FOR RAYS EMITTED BY A LUMINOUS SOURCE

Application filed November 14, 1927, Serial No. 233,277, and in France November 16, 1926.

The invention relates to reflectors, the object of which is to confine within a limited space the maximum of rays emitted by a source of light.

The object of the invention is to provide a reflector wherein all of the luminous rays emitted by a source of light and impinging upon the reflector are reflected in such a way that they will all be combined or united on the same side of a plane previously determined.

In my invention I make use of mirrors of such form and arranged in such a manner that the effect intended may be achieved, while taking into consideration the dimensions of the source of light and the optical distortions of said mirrors, these distortions depending upon the shape, construction, and material of these mirrors.

The invention is applicable to installations or apparatus for lighting purposes which may be either stationary or movable.

The invention is illustrated on the accompanying drawing in which the single figure is a cross-sectional view of a reflector shown diagrammatically.

Assuming a source of light the maximum dimensions of which are comprised between the points $i$, $j$, and $k$, for example the filament of an ordinary electric lamp; it is required to direct the greater part of the reflected rays from this source of light below a plane perpendicular to the plane of the accompanying drawing indicated by the line D E parallel to the symmetrical axis $l\ m$ of the source of light. This is done as follows.

A reflector is constructed composed of mirrors situated on both sides of the straight line or common axis D E, the said mirrors being made of silvered glass, polished metal or any other material generally used for the manufacture of reflecting surfaces. The form or shapes of said mirrors is determined by taking into consideration the various particulars hereinafter set forth.

It is necessary, in the first place, to know or determine experimentally the order of magnitude of the optical distortions which may occur, according to the form, method of construction and material comprising the reflecting surfaces proposed to be utilized.

If, as assumed hereinafter, they are formed of beaten out brass which is silvered and polished, it is necessary to state that such surfaces cannot be made by the average workman or artisan working at radii of curvature presenting, between individual pieces worked or even for various points of the same piece, variations to the extent of one millimeter.

This is why the rectangle $l\ m\ n\ o$ is shown on the drawing four apices of which are distant at least two millimetres from the source of light $i\ j\ k$.

Above the source of light is placed a parabolic mirror $p\ q$ of silvered and polished brass the optical axis of which coincides with the line D E and the focus of which is at $o$. Theoretically and practically, all the luminous rays, the ray $k\ q$, for example, emitted by the source of light $i\ j\ k$ impinging upon any point of the mirror $p\ q$ will be reflected so that they will approach the optical axis of this mirror.

Starting from this point $p$, if it be desired to utilize the mirror $p\ q$ of extended form, both calculation and experience show that it would be necessary to utilize either another process of manufacture than work formed in relief, or to use some material other than silvered brass for the making of said mirror since the variations of radii of curvature practically obtainable between the theoretical shape of the mirror and the form realized by the relief work of the brass being about one millimetre, there may result starting from the point $p$, displacements of the upper foci greater than two millimetres and the obtention of reflected rays, originating from rays emitted by the source of light $i\ j\ k$ which depart from the axis D E.

This is why after having constructed at $p$ the normal to the parabola $p\ q$, there is selected upon this normal $p\ r$, a point $r$ which is such that by taking this point as a centre, and half the length of $p\ r$ as radius the curve described does not meet the rectangle $l\ m\ n\ o$ this point $r$ being selected as the centre of a spherical mirror of silvered brass having the radius *p r*, by which the mirror *p q* is prolonged up to the straight line D E.

Theoretically and practically this mirror will reflect towards the axis D E all the luminous rays *k s*, for example, emitted by the source *i j k* and impinging thereon.

Underneath the source of light there is arranged a second parabolic mirror *v v* of brass silvered and polished, the optical axis of which coincides with the straight line D E, and of which the focus is at *n*. For the reasons hereinbefore set forth starting from the point *u*, this mirror is extended up to the straight line D E by a spherical mirror *u w* having a centre *x* and of which the radius is *x u*, the mirror being such that the point *x* is at the intersection of the normal *u* to the parabola *u v* and the straight line D E. As may be seen, the curve has for its centre the point *x* and the curve produced by taking half the radius *x—u* does not encounter the rectangle *l m n o*. The spherical curve *u w* is prolonged up to the line or axis D E.

The luminous rays emitted from the source of light *i j k*, the rays *i v* and *i w*, for example, meet the mirror *v u w* and will be reflected thereby so that they depart from the axis D E.

The curvature of the mirrors *q p s* and *v u w* being fixed in the manner just described the reflecting surfaces to be utilized will be obtained by rotation of the curves *q p s* and *v u w* round the straight line D E taken as axis, and causing each of these curves to make a rotation of 90 degrees on both sides of the plane in which they lie.

The reflector therefore consists of an upper and a lower part having a common axis D E, of which the upper part comprises an outer parabolic surface *p q* having its focus *o* on the common axis D E and an inner spherical surface *p s* forming a continuation of the parabolic surface and having its center *r* and its focus below the axis. The lower part comprises similar surfaces, of which the outer parabolic surface *u v* has its focus *n* on the common axis D E and in front of the focus *o* of the upper parabolic surface *p q* and an inner spherical surface *v w* forming a continuation of the lower parabolic surface having its center *x* on the common axis and its focus therebelow.

It is, of course, understood that the reflector can be reversed, in which case reference to the points and surfaces above and below axis D E are reversed.

What I claim as my invention and desire to secure by Letters Patent of the United States is:—

A reflector consisting of an upper and a lower part having substantially a common axis, the upper part comprising an outer parabolic surface having its focus on the common axis and an inner spherical surface forming a continuation of the parabolic surface and having its center and its focus below the axis; and the lower part comprising an outer parabolic surface having its focus on the common axis and in front of the focus of the upper parabolic surface and an inner spherical surface forming a continuation of the lower parabolic surface having its center on the axis and its focus below the axis.

In witness whereof I have signed this specification.

JACQUES LOUIS PECH.